(12) United States Patent
Su

(10) Patent No.: US 8,373,372 B2
(45) Date of Patent: Feb. 12, 2013

(54) ELECTRICAL MOTOR/GENERATOR DRIVE APPARATUS AND METHOD

(75) Inventor: Gui Jia Su, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 283 days.

(21) Appl. No.: 12/887,110

(22) Filed: Sep. 21, 2010

(65) Prior Publication Data

US 2011/0074326 A1    Mar. 31, 2011

Related U.S. Application Data

(60) Provisional application No. 61/245,682, filed on Sep. 25, 2009.

(51) Int. Cl.
 *H02P 6/14* (2006.01)
(52) U.S. Cl. ......... 318/400.27; 318/400.26; 318/400.01; 318/700
(58) Field of Classification Search ............. 318/400.27, 318/400.26, 400.01, 700
See application file for complete search history.

(56) References Cited

U.S. PATENT DOCUMENTS

| | | | | |
|---|---|---|---|---|
| 6,719,227 B2 * | 4/2004 | Scuccato | ............... | 241/36 |
| 7,084,590 B2 * | 8/2006 | Miyamoto et al. | .......... | 318/400.3 |
| 7,310,475 B2 * | 12/2007 | Okuda et al. | .................. | 388/805 |
| 7,348,739 B2 * | 3/2008 | Urakabe et al. | ............ | 318/254.2 |
| 7,439,697 B2 * | 10/2008 | Miyazaki et al. | ........ | 318/400.41 |
| 7,466,086 B2 * | 12/2008 | Kiuchi et al. | .................... | 318/41 |
| 7,701,156 B2 * | 4/2010 | Okamura | ...................... | 318/255 |

OTHER PUBLICATIONS

Sasaki et al. "Toyota's Newly Developed Electric-Gasoline Engine Hybrid Power Train System." Proc. of EVS, 14 (Dec. 1997) 1-8.
Ogawa et al. "Development of a Power Train for the Hybrid Automobile—the Civic Hybrid." SAE Tech. Pap. Ser., No. 2003-01-0083 (Mar. 2003).
Muta et al. "Development of New-Generation Hybrid System THS II—Drastic Improvement of Power Performance and Fuel Economy." SAE Tech. Pap. Ser., No. 2004-01-0064 (Mar. 2004).
Okamura et al. "Development of Hybrid Electric Drive System Using a Boost Converter." Proc. of EVS, 20 (Nov. 2003) 1-12.
Ishikawa et al. "Development of Next Generation Fuel-Cell Hybrid System—Consideration of High Voltage System." SAE Tech. Pap. Ser., No. 2004-01-1304 (Mar. 2004).
Yusaku et al. "Development of the Intelligent Power Unit for the V6 Hybrid Midsize Sedan." SAE Tech. Pap. Ser., No. 2005-01-0275 (Apr. 2005).

* cited by examiner

*Primary Examiner* — Bentsu Ro
*Assistant Examiner* — David Luo
(74) *Attorney, Agent, or Firm* — Novak Druce Connolly Bove + Quigg LLP

(57) ABSTRACT

The present disclosure includes electrical motor/generator drive systems and methods that significantly reduce inverter direct-current (DC) bus ripple currents and thus the volume and cost of a capacitor. The drive methodology is based on a segmented drive system that does not add switches or passive components but involves reconfiguring inverter switches and motor stator winding connections in a way that allows the formation of multiple, independent drive units and the use of simple alternated switching and optimized Pulse Width Modulation (PWM) schemes to eliminate or significantly reduce the capacitor ripple current.

17 Claims, 10 Drawing Sheets

ELECTRICAL MOTOR/GENERATOR DRIVE APPARATUS AND METHOD

CROSS-REFERENCE TO RELATED APPLICATIONS

This application claims the benefit of Provisional Application Ser. No. 61/245,682 entitled "ELECTRICAL MOTOR/GENERATOR DRIVE APPARATUS AND METHOD", filed Sep. 25, 2009, which is herein incorporated by reference in its entirety

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

THE NAMES OF THE PARTIES TO A JOINT RESEARCH AGREEMENT

None.

BACKGROUND OF THE INVENTION

1. Field of the Invention

This disclosure relates to electric motors and more specifically to electrical motor drive methods and apparatuses.

2. Description of the Related Art

The use of electric vehicles (EVs) has been promoted in recent years as an effective way to reduce crude oil consumption and emissions of harmful pollutants and green-house gasses. EVs broadly include battery powered electric vehicles (BEVs), fuel cell powered vehicles, and hybrid electric vehicles (HEVs).

HEVs employ an energy storage device such as a battery and an electrical motor drive system that are designed to optimize the energy conversion efficiency of an internal combustion engine. They also capture a portion of the kinetic energy of the vehicle for later use through dynamic braking by the motor during deceleration. An electrical motor drive system may include one or more drive units and each drive unit typically consists of a power inverter and a motor. The inverter either functions to convert a direct-current (DC) voltage to an alternating-current (AC) voltage suitable to operate the motor, or functions as a converter when the motor is operating in power generation mode. Multiple electrical drive units can be used to provide dual-wheel or four-wheel drive capabilities.

A power inverter in HEVs operates off a DC voltage source, such as a battery, and typically produces a three-phase AC voltage with adjustable frequency and amplitude to control a three-phase AC motor. As an example, FIG. 1 illustrates a block diagram of a conventional electrical motor drive system 10 including a DC power supply 12, a DC bus filter capacitor 14, a three-phase inverter 16, and a three-phase motor/generator 18 for parallel HEVs or battery electric vehicles BEVs. In the motor 18, three-phase currents flowing through the stator windings 20 create a rotating electrical field, causing a rotor to spin.

Power semiconductor devices, such as the insulated-gate-bipolar transistor (IGBT) and diode connected in anti-parallel fashion or the Metal-Oxide-Semiconductor Field-Effect-Transistor (MOSFET), are often used for the inverter 16 switches, ($S_1$-$S_6$). An electronic controller 22, based on one or more microprocessors, is typically used to control operations of the electrical motor drive system 10. A gate driver circuit 24 is also used to convert the low-voltage digital control signals generated by the controller 22 to higher voltage gating signals that are suitable for turning on or off the semiconductor switches ($S_1$-$S_6$) and to provide galvanic isolation between the power inverter and the electronic controller.

The electric motor 18 is controlled by the inverter 16 and powered by the battery 12 to handle the variations in the driving force demands for optimizing the fuel efficiency of a vehicle. For charging the battery 12, the motor 18 functions as a generator driven by the engine or by the vehicle's inertia during deceleration and produces an AC voltage, which is converted by the inverter 16 to a DC voltage at a level that is suitable to charge the battery 12.

The ratio of conduction to non-conduction time interval for each switch ($S_1$-$S_6$) is determined by using a pulse width modulation (PWM) scheme to adjust the amplitude and frequency of the fundamental component of the inverter 16 output voltage. The PWM switching of the motor currents generates a pulsed inverter DC bus current consisting of a DC component and large ripple AC current components, as shown in FIG. 2 as an example.

Referring now to FIG. 2, the current waveforms at the battery $I_{bat}$, the inverter $I_{inv}$, the DC bus capacitor $I_{Cbus}$, and the stator windings $i_a, i_b, i_c$ are shown. The root-mean-squared (rms) value of the sum of all the ripple components in the inverter DC-link current can reach up to fifty percent (50%) of the motor current. The inverter DC-bus current can be expressed by equation 1 below.

$$i_{inv}=I_{dc}+\Sigma_{k=0}^{\infty}\Sigma_{n=1}^{\infty}I_{n,k}\sin[2\pi(nf_{sw}\pm 6kf_m)t+\alpha_{n,k}] \quad (1)$$

In equation 1, the first term is the DC component and the second term represents the ripple components, which have frequencies of multiples of the switching frequency ($f_{sw}$) or their side bands associated with the fundamental frequency ($f_m$).

To absorb the large ripple currents, which are detrimental to the battery 12, and to maintain a near ideal voltage source to the inverter 16, the inverter 16 generally requires the use of a very high performance DC bus capacitor 14. The DC bus capacitor 14 is physically located close to the inverter switches ($S_1$-$S_6$) when installed.

Currently available capacitors 14 that can meet the demanding requirements of HEV application are both costly and bulky. Further, their ripple current handling capability drops rapidly as the ambient temperature increases. Thus, a low temperature liquid cooling system is oftentimes needed to operate the inverters in the engine compartment of an HEV, adding cost, weight and complexity to the vehicle. As a result, conventional inverter designs make it difficult to meet cost, volume and lifetime requirements for HEV applications.

SUMMARY

Electrical motor/generator drive systems are disclosed. The drive systems include a battery and a DC bus filter capacitor that is connected in parallel with the battery. An inverter having pairs of switches is connected in parallel with the DC bus filter capacitor. One or more motor/generators, defining at least two sets of stator windings, are coupled to the pairs of inverter switches. Each of the sets of windings can be used independently cause motion of a rotor in one of the motor/generators. The pairs of the switches associated with each set of stator windings define an inverter bridge. Thus each inverter bridge forms an independent drive unit for each stator winding set.

Control methods for such drive systems are also disclosed. The methods include performing a first step of obtaining plurality of triangular carrier signals, where each of the carrier signals is associated with one of the drive units. Each of the carrier signals configured to have an electrical degree phase shift with respect to each other. Next, a plurality of modulation signals are obtained, where each of the pairs of inverter switches in each drive unit is associated with one of the modulation signals. Thereafter a set of control signals for the inverter switches in the drive units are generated based on comparison of the plurality of modulation signals to one of the plurality of triangular carrier signals associated with the one of the plurality of drive units.

These and other objects, features and advantages will become apparent to those skilled in the art in view of the following detailed description and accompanying illustrations of multiple examples.

DETAILED DESCRIPTION

Figure 1:
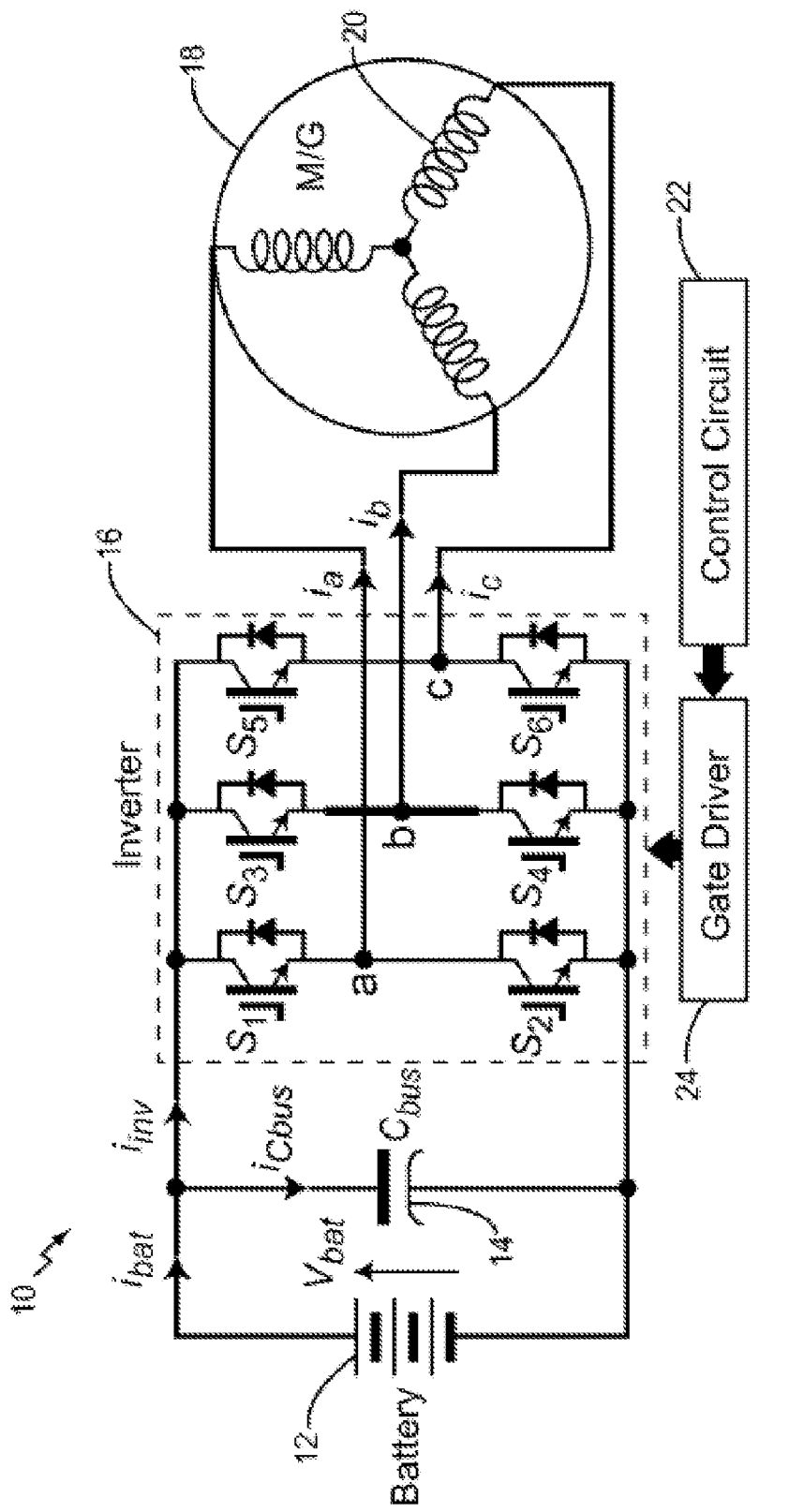
FIG. 1 illustrates an example of a prior art motor control system.
Figure 2:
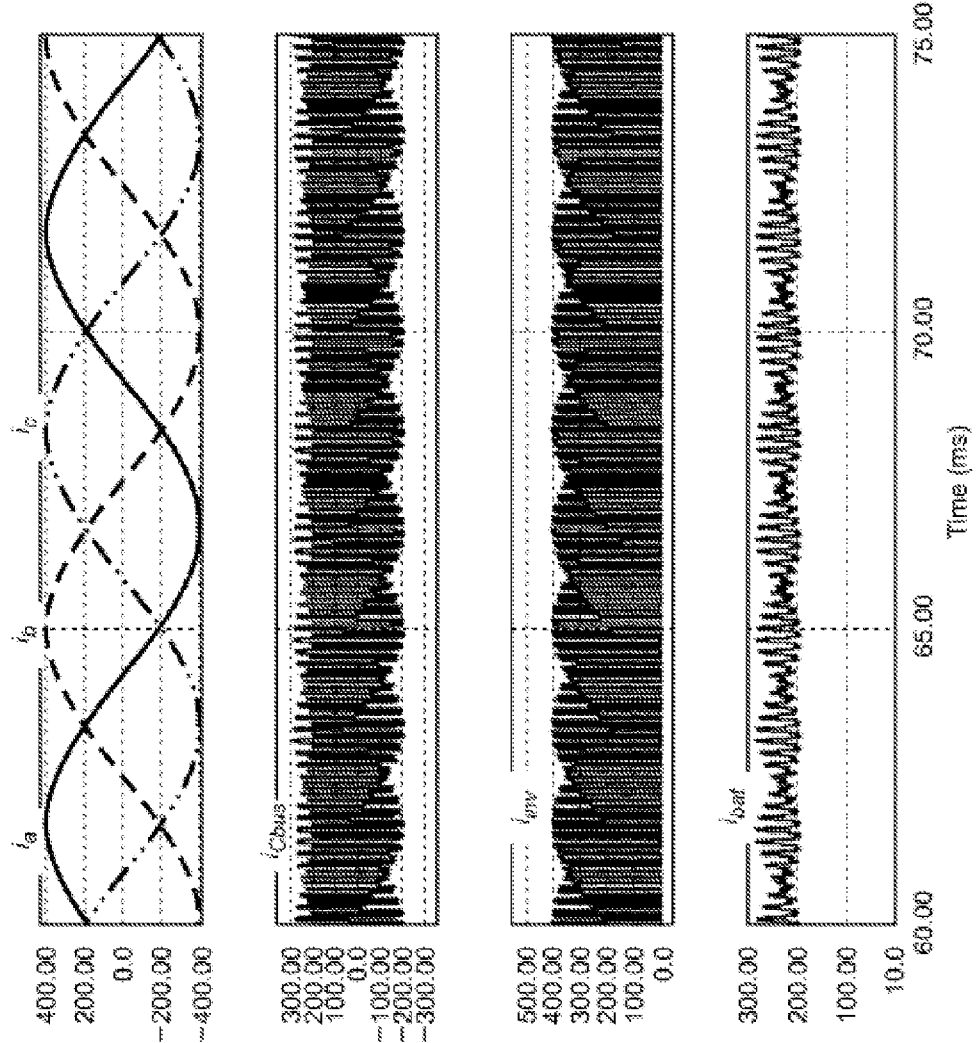
FIG. 2 illustrates electrical current waveforms in various components of the prior art motor control system of FIG. 1.

The invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 3:
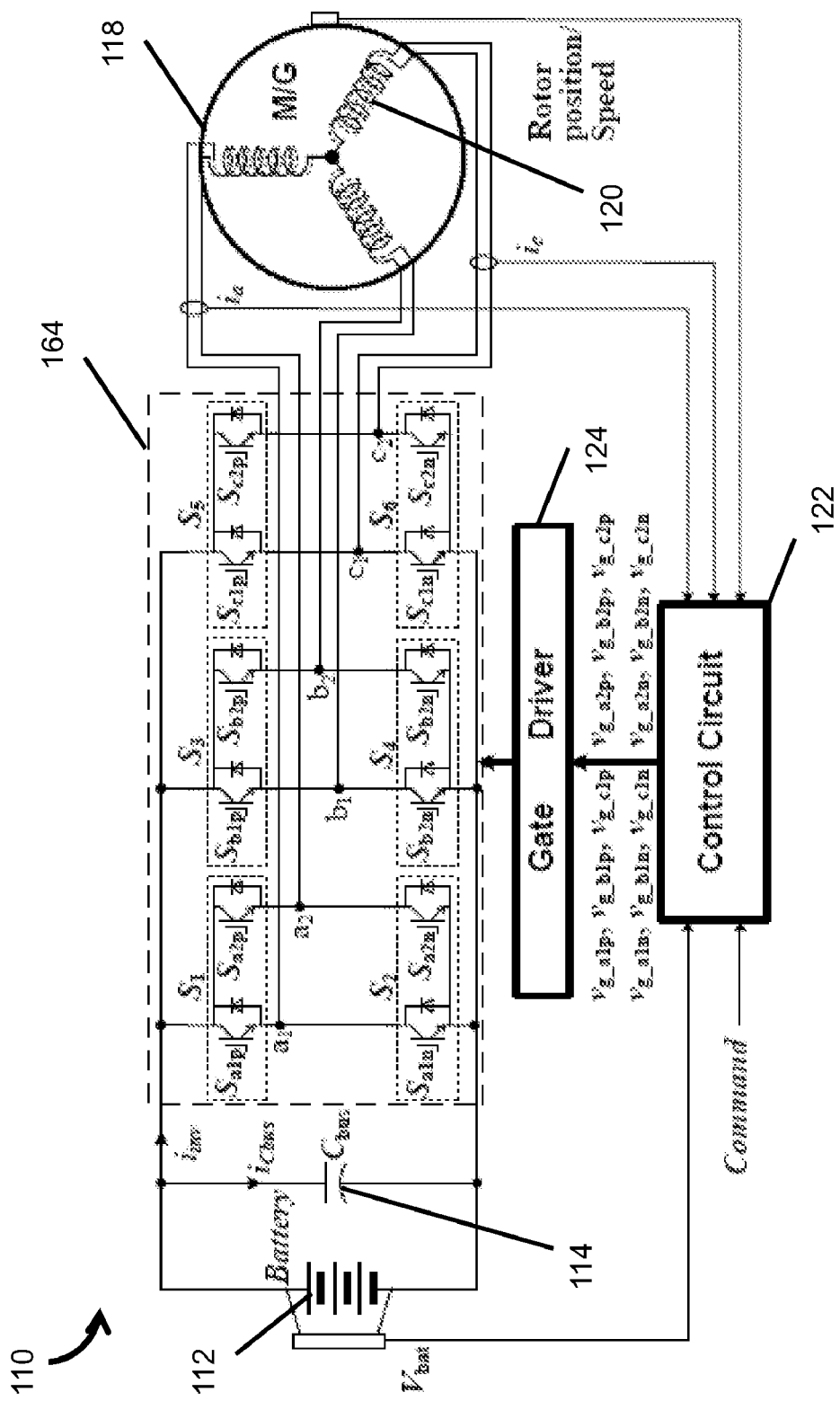
FIG. 3 illustrates a first example of a motor control system in accordance with the various embodiments of the invention.

FIG. 3 illustrates a first example of an electrical motor drive system according to the present disclosure. The system 110 includes a battery 112 or any other DC power supply, a DC bus filter capacitor 114, a three-phase inverter 116 and a three-phase electrical motor/generator 118. The inverter 116 switches ($S_{a1p}$, $S_{a1n}$, $S_{b1p}$, $S_{b1n}$, $S_{c1n}$, $S_{c1p}$, $S_{a2p}$, $S_{a2n}$, $S_{b2p}$, $S_{b2n}$, $S_{c2n}$, and $S_{c2p}$) and Y-connected stator windings 120 in the motor 118 are separated into two sets of windings ($a_1$, $b_1$, $c_1$) and ($a_2$, $b_2$, $c_2$), where each set of windings includes a winding associated with a phase group. As used herein with respect to stator windings, the term "phase group" refers to windings associated with a same AC signal component of an AC poly-phase signal.

Further, as shown in FIG. 3, each phase group of the stator windings ($a_1$, $a_2$), ($b_1$, $b_2$), and ($c_1$, $c_2$) are co-located. That is, each phase group of stator windings is disposed in a same portion, region, or slot of the stator. For example, the phase group of windings can be disposed next to each other or intertwined, but galvanically isolated. The common points (i.e., the neutral node) of the two sets of the stator windings can be coupled together. Each group of switches ($S_{a1p}$, $S_{a1n}$, $S_{b1p}$, $S_{b1n}$, $S_{c1n}$, $S_{c1p}$) and ($S_{a2p}$, $S_{a2n}$, $S_{b2p}$, $S_{b2n}$, $S_{c2n}$, $S_{c2p}$) is connected as an inverter bridge and connects to one set of the motor stator windings 119, forming an independent drive unit.

Although the various embodiments are illustrated with a single capacitor 114, this is for illustrative purposes only. Accordingly, the invention is not limited in this regard. Rather, any bus filter capacitor circuit providing the functionality of a single bus filter capacitor 114 can be used in the various embodiments of the invention.

An electronic controller 122, based on one or more microprocessors, is used to control operations of the electrical motor drive system 110. The electronic controller 122 can take measurements of two motor phase currents ($i_a$ and $i_c$), rotor position/speed, battery voltage ($V_{bat}$), and/or motor speed or torque commands as inputs and carries out a predefined motor control algorithm to generate a set of three-phase modulation signals ($v_a$, $v_b$, $v_c$). Any known methods can be used for generating the modulation signals. In the configuration illustrated in FIG. 3, the controller 122 further performs pulse width modulations by comparing the three-phase modulation signals with two carrier signals that have an electrical degree phase shift between to generates two sets of low-voltage digital control signals ($v_{g\_a1p}$, $v_{g\_a1n}$, $v_{g\_b1p}$, $v_{g\_b1n}$, $v_{g\_c1n}$, $v_{g\_c1p}$) and ($v_{g\_a2p}$, $v_{g\_a2n}$, $v_{g\_b2p}$, $v_{g\_b2n}$, $v_{g\_c2n}$, $v_{g\_c2p}$) for controlling the switching timing of the switches. A gate driver circuit 124 is also used to convert the low-voltage digital control signals generated by the controller 122 to higher voltage gating signals that are suitable for turning-on or turning-off the switches in the inverter 116. The timing of turning-on and turning-off of the corresponding switches in the two independent drive units is controlled in a way that minimizes the DC bus ripple currents.

Although the various embodiments are illustrated with switches comprising a bipolar transistor and a diode connected in anti-parallel fashion, this is for illustrative purposes only. Accordingly, the invention is not limited in this regard. Rather, any type of switch element or circuit providing the functionality of the switches illustrated in exemplary embodiments can be used in the various embodiments of the invention.

Figure 4:
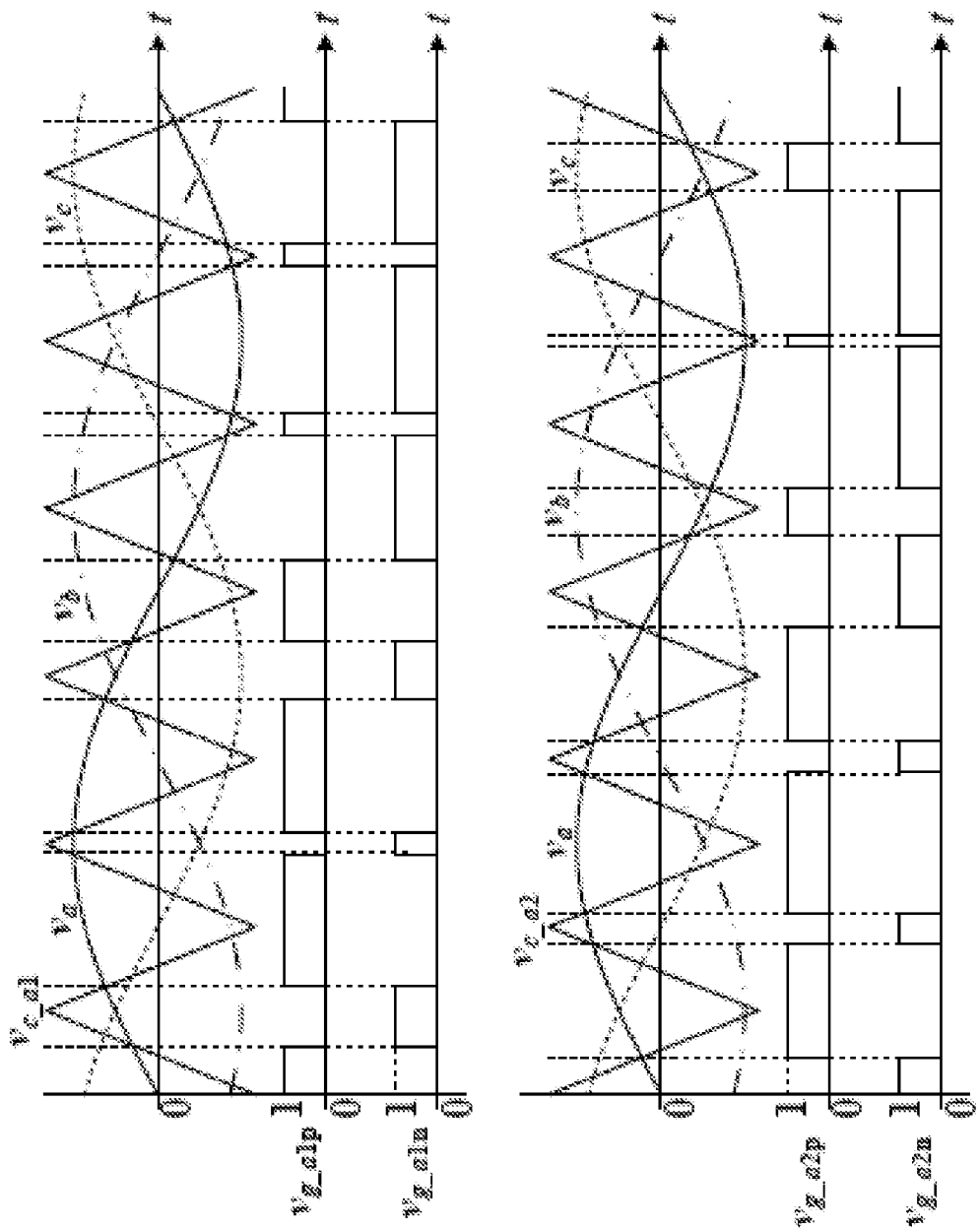
FIG. 4 illustrates interleaved switching according to the example of FIG. 3.

FIG. 4 graphically illustrates an exemplary method of controlling switching for two independent drive units in accordance with the various embodiments. In FIG. 4, the switch control signals are generated by comparing three-phase modulation signals, ($v_a$, $v_b$, $v_c$) with two triangular carrier signals, $v_{c\_a1}$ for the first drive unit and $v_{c\_a2}$ for the second drive unit. In particular, FIG. 4 illustrates how switch control signals are generated for a first inverter switch pair $S_{a1p}$, $S_{a1n}$ and a second inverter switch pair $S_{a2p}$, $S_{a2n}$, associated with a first phase group ("phase a") of first and second drive units, respectively. The switch control signals for the remainder of the switches associated with the other phases can be generated in a similar fashion.

As used herein, the term "inverter switch pair" refers to the serial combination of two switch elements in an inverter bridge coupled to a DC power supply, where a common node of the two switch elements is coupled to a stator winding. The term "positive switch" refers to the switch element in the inverter switch pair coupled between a stator winding and a positive or high voltage terminal of a DC power supply. The term "negative switch" refers to the switch element in the inverter switch pair coupled between a stator winding and a negative or low voltage terminal of a DC power supply.

The generation of the switch control signals for switches $S_{a1p}$, $S_{a2p}$, $S_{a1n}$, and $S_{a2n}$ is as follows. First, a current value of the phase a modulation signal $v_a$ is compared with $v_{c\_a1}$, the carrier signal for the first drive unit. When $v_a > v_{c\_a1}$, a control signal corresponding to a digital high or "1" is provided as the switch control signal ($v_{g\_a1p}$) for positive switch ($S_{a1p}$). Otherwise, a digital low of "0" (i.e., when $v_a < v_{c\_a1}$) is provided as the switch control signal for switch $S_{a1p}$. The switch control signal ($v_{g\_a1n}$) for a corresponding negative switch ($S_{a1n}$) can then be generated by logically inverting $v_{g\_a1p}$. However, the various embodiments are not limited in this regard and switch control signals for the negative switches can be independently generated based on the comparison above.

Concurrently, the current value of the phase a modulation signal $v_a$ is compared with $v_{c\_a2}$, the carrier signal for the second drive unit. When $v_a > v_{c\_a2}$, a control signal corresponding to a digital high or "1" is provided as the switch control signal ($v_{g\_a2p}$) for positive switch ($S_{a2p}$). Otherwise, a digital low of "0" (i.e., when $v_a < v_{c\_a2}$) is provided as the switch control signal for switch $S_{a2p}$. The switch control signal ($v_{g\_a2n}$) for a corresponding negative switch ($S_{a2n}$) can then be generated by logically inverting $v_{g\_a2p}$. However, the various embodiments are not limited in this regard and switch control signals for the negative switches can be independently generated based on the comparison above.

Switch control signals for the positive switches associated with other phases can be similarly generated by comparing the respective modulation signal with the corresponding carrier signal. Further, as described above, switch control signals for the negative switches can be obtained by logically inverting the corresponding first switch control signal. In the embodiment illustrated in FIG. 4, the two carrier signals are identical except there is a 180 electrical degrees phase shift between the two signals. The resultant inverter DC bus currents of the two units and their combined one can be expressed by equations 2-4 below.

$$I_{inv1} = 0.5 \left\{ I_{dc} + \sum_{k=0}^{\infty} \sum_{n=1}^{\infty} I_{n,k} \sin[2\pi(nf_{sw} \pm 6kf_m)t + \alpha_{n,k}] \right\} \quad (2)$$

$$I_{inv2} = 0.5 \left\{ I_{dc} + \sum_{k=0}^{\infty} \sum_{n=1}^{\infty} I_{n,k} \sin[2\pi(nf_{sw} \pm 6kf_m)t + \beta_{n,k}] \right\} \quad (3)$$

$$I_{inv} = I_{dc} + \sum_{k=0}^{\infty} \sum_{n=1}^{\infty} \sqrt{\frac{1 + \cos(\beta_{n,k} - \alpha_{n,k})}{2}} \quad (4)$$

$$I_{n,k} \sin\left[2\pi(nf_{sw} \pm 6kf_m)t + \frac{\alpha_{n,k} + \beta_{n,k}}{2}\right]$$

As shown in the equations above, the amplitude of each combined ripple component can be reduced by introducing a phase shift into the corresponding ripple components of the two drive units, i.e. $\beta_{n,k} \neq \alpha_{n,k}$. Moreover, the combined ripple current components can be reduced to zero by introducing a 180 electrical degree phase shift into the corresponding ripple components of the two drive units. Shifting the carrier signals as shown in FIG. 4 can lead to cancellation of some of the ripple current components while reducing others. The net effect is a significantly reduced DC bus ripple current to be filtered out by the DC bus capacitor. As a result of the reduced DC ripple current, the size of capacitors 114 can be reduced by 55%-75%. Thus, less costly and less bulky capacitors can be used. Further such capacitors typically would not require a low temperature liquid cooling system.

The control methodology described above with respect to FIG. 4 is not limited solely to control of a drive system in accordance with FIG. 3. Rather, the control methodology can be used with various other configurations in which multiple drive units are being powered by a single DC voltage supply and reduction of DC ripple current is desired.

Figure 5:
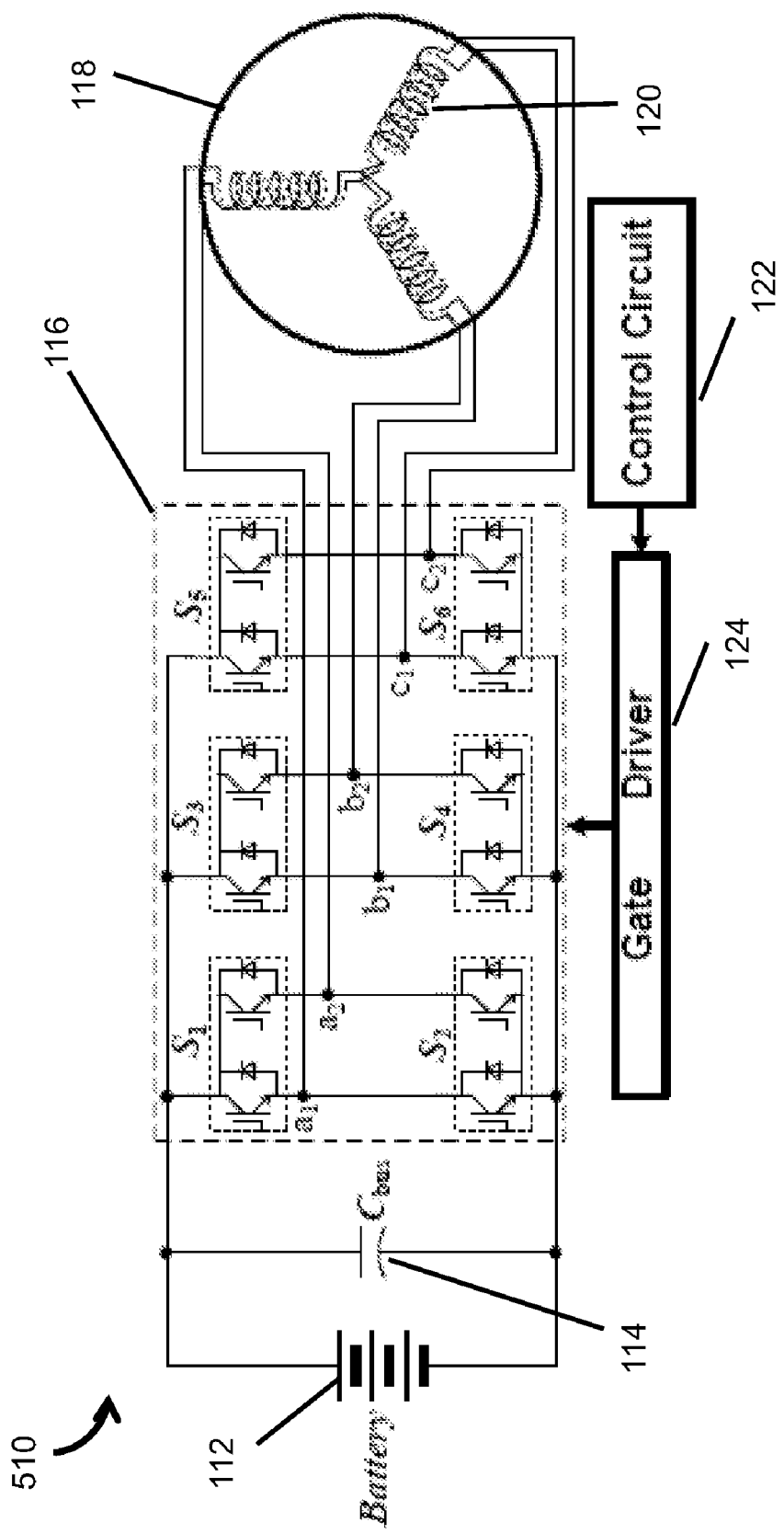
FIG. 5 illustrates a second example of a motor control system in accordance with the various embodiments of the invention.

For example, FIG. 5 illustrates a second example of an electrical motor drive system 510 configured in accordance with an embodiment of the invention. Similar to system 110, system 510 includes a battery 112, a DC bus filter capacitor 114, and a three-phase inverter 116 coupled to a three-phase electrical motor/generator 118. Further, the switches in inverter 116 and Y-connected stator windings 120 in the motor 118 are separated into two sets ($a_1$, $b_1$, $c_1$) and ($a_2$, $b_2$, $c_2$) and each phase group of the stator windings ($a_1$, $a_2$), ($b_1$, $b_2$), and ($c_1$, $c_2$) are co-located. Further, an electronic controller 122 controls the operations of the electrical motor drive system 510 and gate driver circuit 124 is also used to convert the low-voltage digital control signals generated by the controller 122 to higher voltage gating signals that are suitable for turning-on or turning-off the switches in inverter 116. However, in contrast to system 110, the neutral nodes of the two sets of the stator windings in system 510 are galvanically isolated. Nonetheless, the timing of turning-on and turning-off of the corresponding switches in the two independent drive units can be controlled in a way that minimizes the DC bus ripple currents by using the methods described above with respect to FIGS. 3 and 4.

Figure 6:
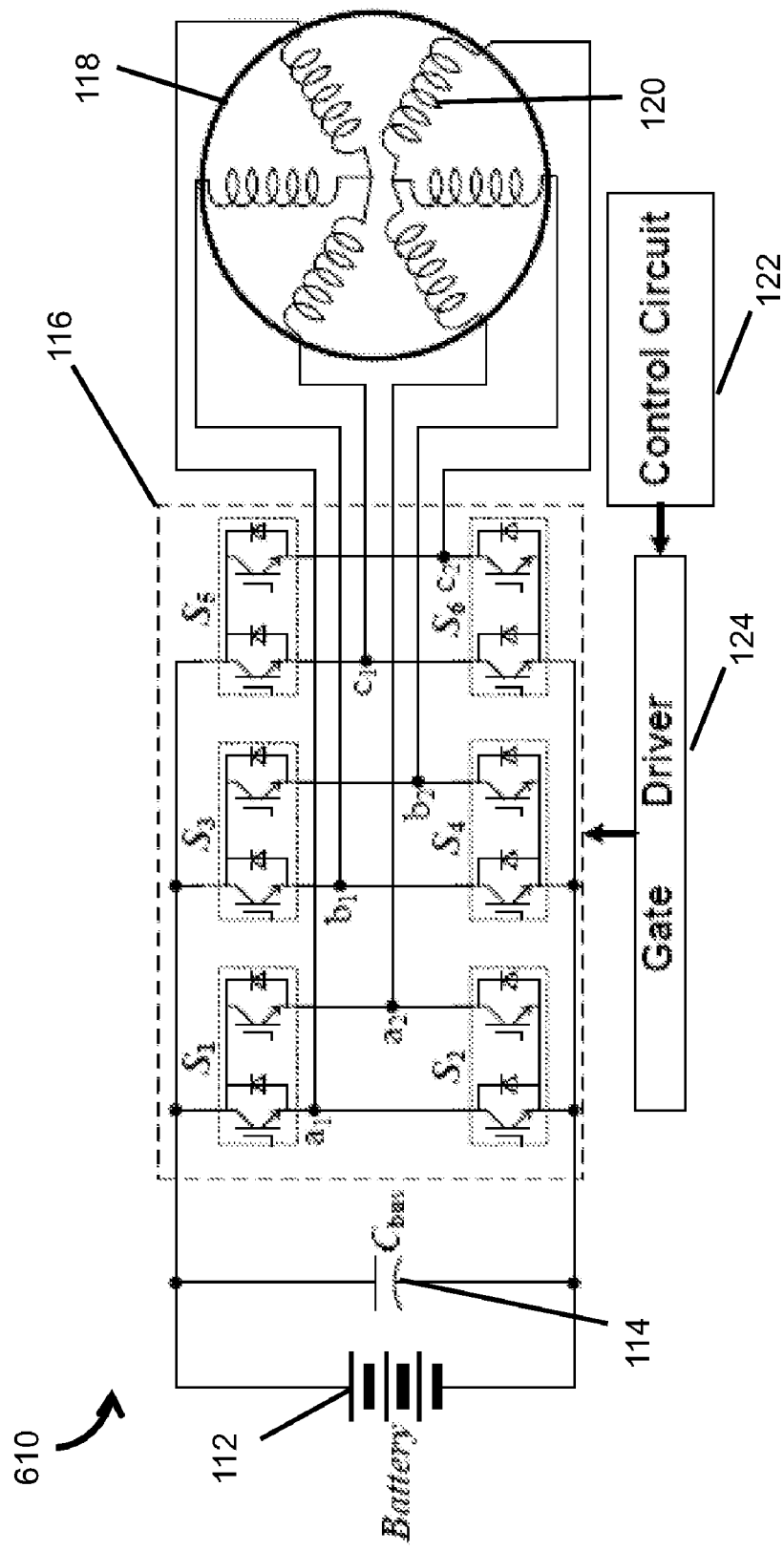
FIG. 6 illustrates a third example of a motor control system in accordance with the various embodiments of the invention.

In another example, FIG. 6 illustrates a third example of an electrical motor drive system 610 configured in accordance with an embodiment of the invention. Similar to system 110, the system 610 includes a battery 112, a DC bus filter capacitor 114, and a three-phase inverter 116 coupled to a three-phase electrical motor/generator 118. The switches in inverter 116 and Y-connected stator windings 120 in the motor 118 are separated into two groups ($a_1$, $b_1$, $c_1$) and ($a_2$, $b_2$, $c_2$). An electronic controller 222 controls the operations of the electrical motor drive system 210. A gate driver circuit 124 is also used to convert the low-voltage digital control signals generated by the controller 122 to higher voltage gating signals that are suitable for turning-on or turning-off the switches in inverter 116. However, in contrast to system 110, the two sets of the stator windings in system 610 are spatially separated. That is, the stator windings occupy different stator slots.

Further, the neutral nodes of the two sets of the stator windings are not bundled together. Despite these differences, the timing of turning-on and turning-off of the corresponding switches in the two independent drive units can also be controlled in a way that minimizes the DC bus ripple currents by using the methods described above with respect to FIGS. 3 and 4.

Figure 7:
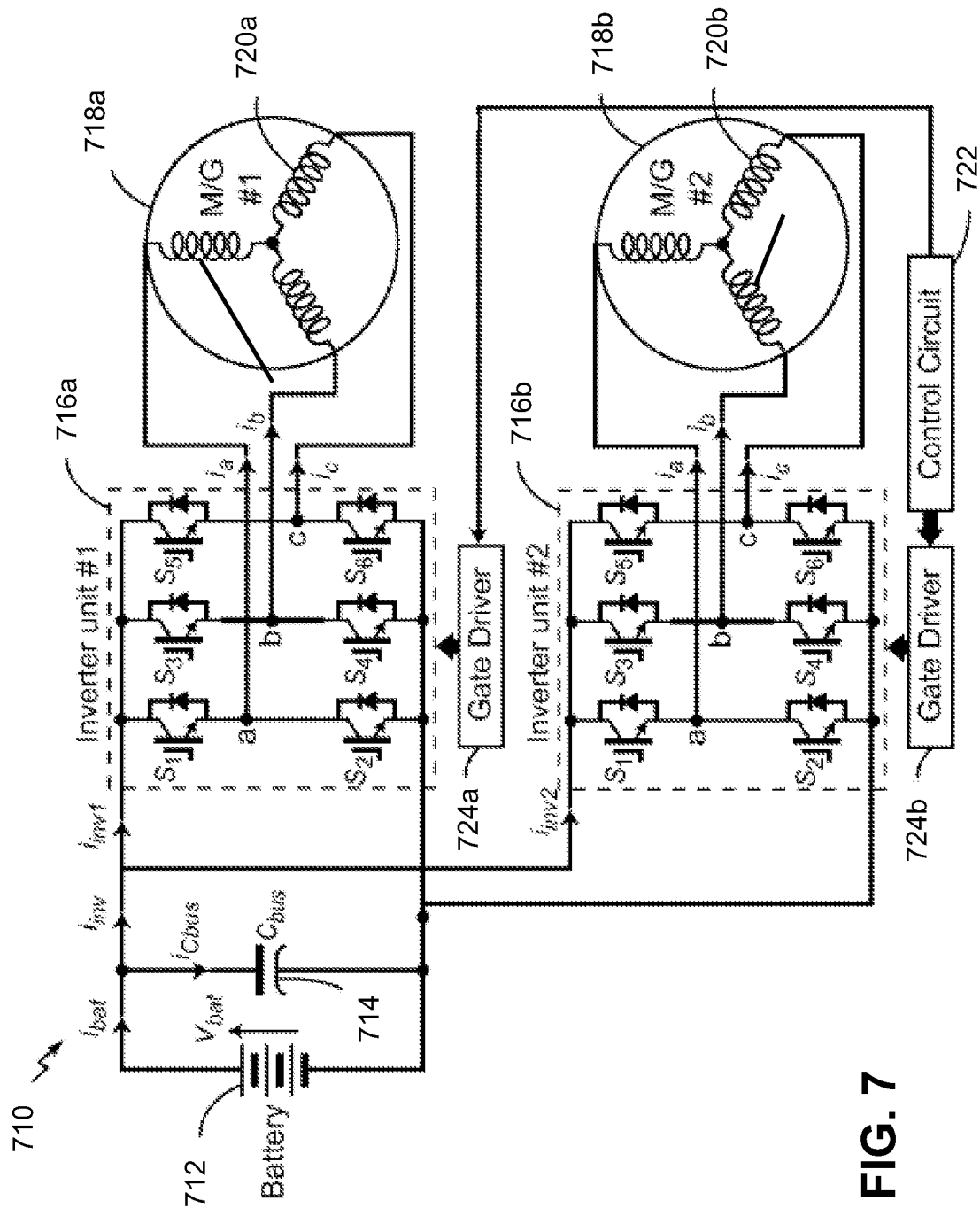
FIG. 7 illustrates a fourth example of a motor control system in accordance with the various embodiments of the invention.

In still another example, FIG. 7 illustrates a fourth example of an electrical motor drive system 710 according to the present disclosure. The system includes a battery 712, a DC bus capacitor 714, and two identical, separate drive units, each consisting of a three-phase inverter 716a and 716b and a three-phase motor/generator 718a and 718b. Each of the motors 718a and 718b has a set of stator windings 720a and 720b.

An electronic controller 722 based on one or more microprocessors controls the operations of the electrical motor drive system 710. Gate driver circuits 724a and 724b are also used to convert the low-voltage digital control signals generated by the controller 722 to higher voltage gating signals that are suitable for turning-on or turning-off the semiconductor switches in each of the drive units. A phase shift is introduced into the carrier signals for the two drive units as described above with respect to FIGS. 3 and 4 to reduce the combined inverter (DC) bus ripple current.

Figure 8A:
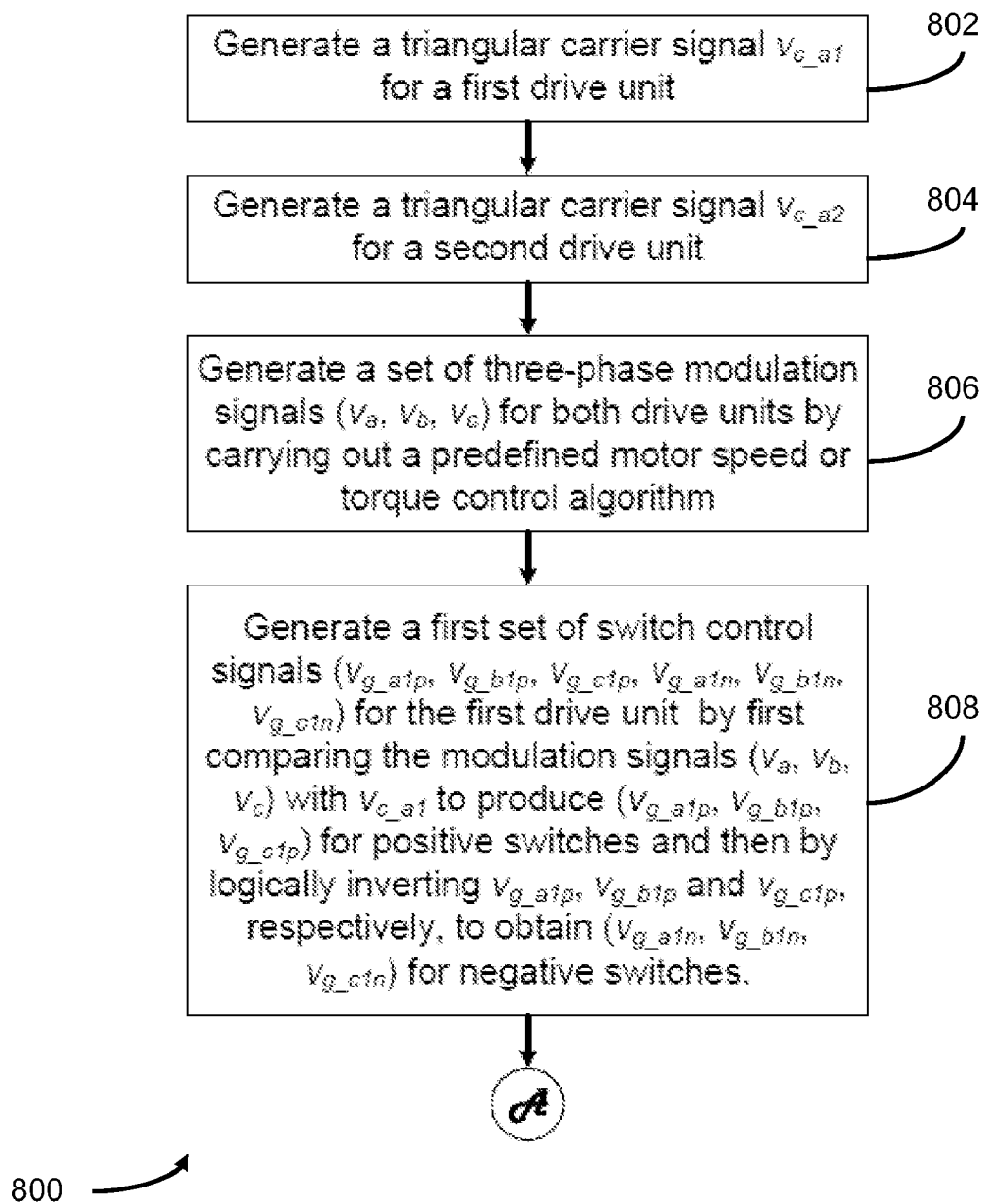
FIGS. 8A and 8B show a flow chart illustrating the various method steps for performing an electrical motor/generator drive control method in accordance with the various embodiments of the invention.
Figure 8B:
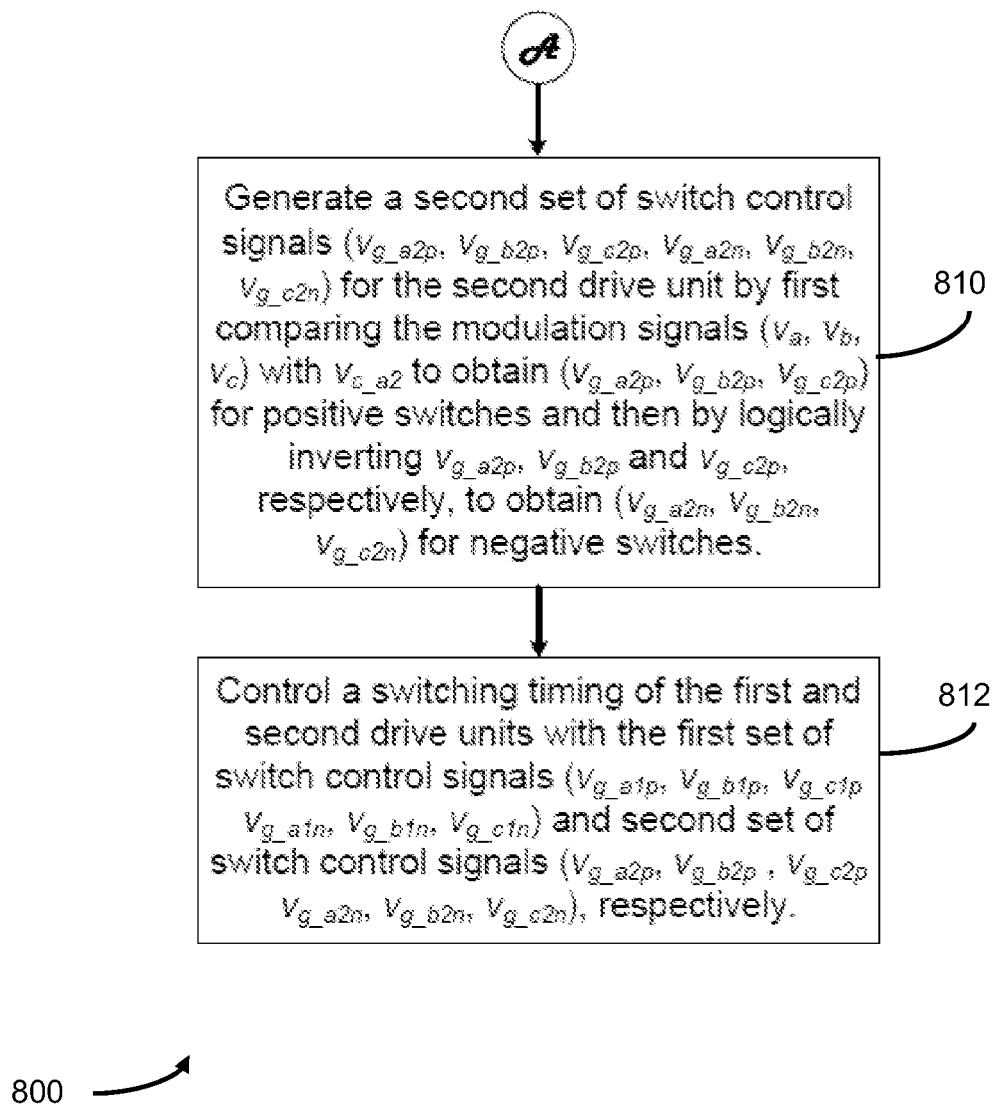

Referring now to FIG. 8, an electrical motor/generator drive control method 800 is illustrated. In a first step represented by block 802, a first, triangular carrier signal $v_{c\_a1}$ for a first drive unit is generated. Next, as represented by block 804, a second, triangular carrier signal $v_{c\_a2}$ is generated for a second drive unit that has an electrical degree phase shift in relation to the first carrier signal $v_{c\_a1}$. Next, as represented by block 806, a set of three-phase modulation signals ($v_a$, $v_b$, $v_c$) is generated for both drive units by carrying out a pre-defined motor speed or torque control algorithm.

Once the various carrier and modulation signals are generated at blocks 802-806, a first set of switch control signals ($v_{g\_a1p}$, $v_{g\_b1p}$, $v_{g\_c1p}$, $v_{g\_a1n}$, $v_{g\_b1n}$, $v_{g\_c1n}$) is generated for the first drive unit at block 808. In particular, the switch control signals are generated by first comparing the modulation signals ($v_a$, $v_b$, $v_c$) with the first carrier signal $v_{c\_a1}$ to obtain ($v_{g\_a1p}$, $v_{g\_b1p}$, $v_{g\_c1p}$) for the positive switches and then by logically inverting $v_{g\_a1p}$, $v_{g\_b1p}$ and $v_{g\_c1p}$, respectively, to obtain $v_{g\_a1n}$, $v_{g\_b1n}$, $v_{g\_c1n}$) for the negative switches. Also, a second set of switch control signals ($v_{g\_a2p}$, $v_{g\_b2p}$, $v_{g\_c2p}$, $v_{g\_a2n}$, $v_{g\_b2n}$, $v_{g\_c2n}$) is generated for the second drive unit by first comparing the modulation signals ($v_a$, $v_b$, $v_c$) with the second carrier signal $v_{c\_a2}$ to obtain ($v_{g\_a2p}$, $v_{g\_b2p}$, $v_{g\_c2p}$) and then by logically inverting ($v_{g\_a2p}$, $v_{g\_b2p}$ and $v_{g\_c2p}$, respectively, to obtain ($v_{g\_a2n}$, $v_{g\_b2n}$, $v_{g\_c2n}$) for the second switches as represented by block 810. Finally in block 812, the switches of the first and second drive units are controlled with the first set of switch control signals ($v_{g\_a1p}$, $v_{g\_b1p}$, $v_{g\_c1p}$, $v_{g\_a1n}$, $v_{g\_b1n}$, $v_{g\_c1n}$) and the second set of switch control signals ($v_{g\_a2p}$, $v_{g\_b2p}$, $v_{g\_c2p}$, $v_{g\_a2n}$, $v_{g\_b2n}$, $v_{g\_c2n}$) respectively.

Although the various exemplary embodiments are shown as including only two drive units, the various embodiments of the invention are not limited in this regard. Rather, any number of drive units can be used in the various embodiments of the invention. In such configurations, a carrier signal is generated for each of the drive units, where each of the carrier signals are evenly separated in phase. That is, each of the carrier signals is separated in electrical degree phase by an amount $2\pi/n$, where n is the total number of drive units.

EXAMPLES

The following non-limiting Examples serve to illustrate selected embodiments of the invention. It will be appreciated that variations in proportions and alternatives in elements of the components shown will be apparent to those skilled in the art and are within the scope of embodiments of the invention.

Figure 9:
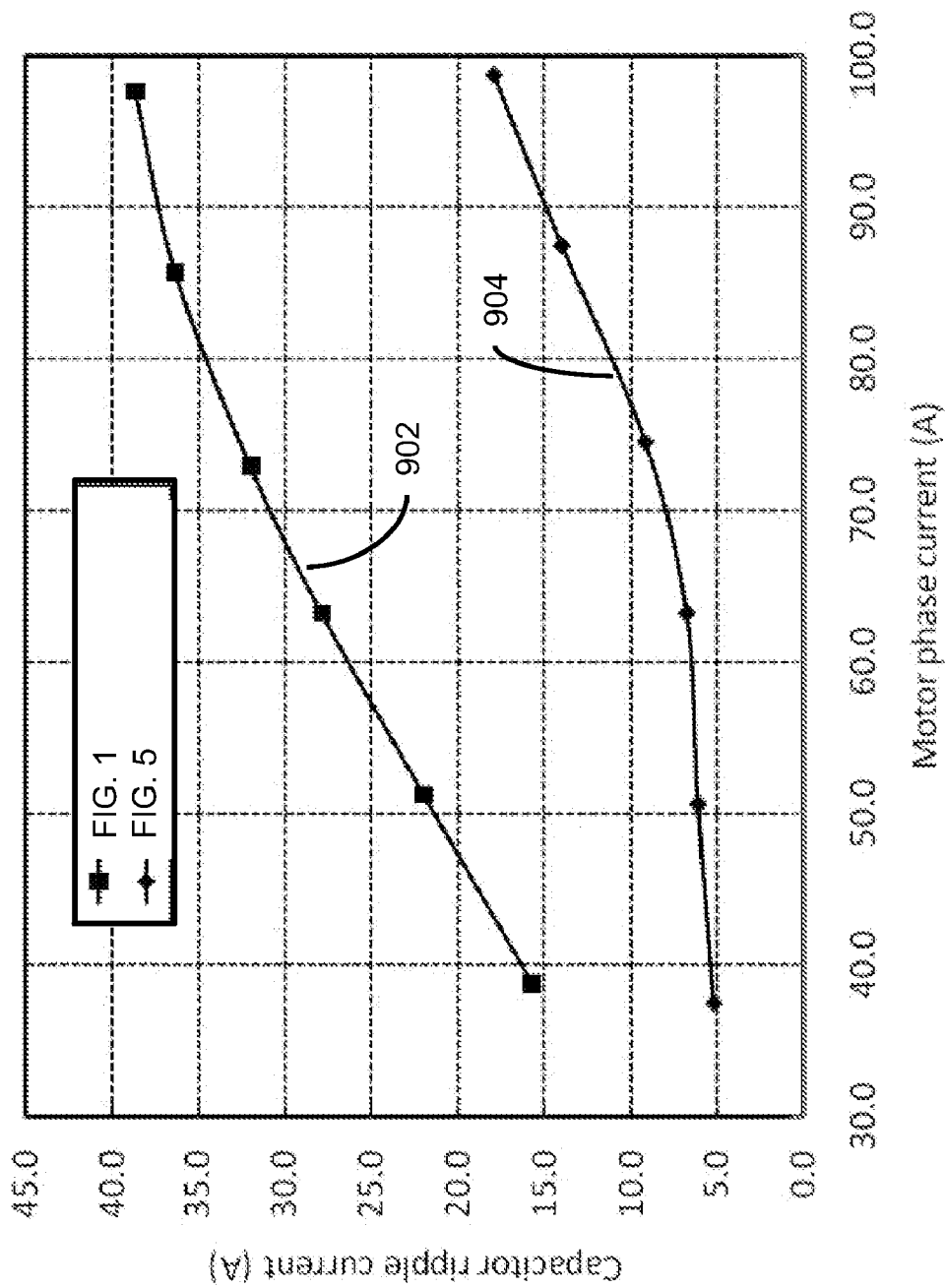
FIG. 9 is an X-Y plot of capacitor ripple current as a function of motor phase current for a conventional drive system configuration as in FIG. 1 and a drive system configured in accordance with the embodiment illustrated in FIG. 5.

FIG. 9 is an X-Y plot 900 of capacitor ripple current as a function of motor phase current for a conventional drive system configuration as in FIG. 1 (Curve 902) and a drive system configured in accordance with the embodiment illustrated in FIG. 5 (Curve 904). For purposes of FIG. 9, the two systems were configured to utilize a DC power supply outputting 300V, a 400 μF capacitor, IGBT switches (as described above), and a three-phase induction motor with two sets of Y-connected stator windings, where the neutral nodes of the windings are not directly coupled.

Control of the IGBT switches was provided using a TMS320F2812 digital signal processor (DSP) manufactured by Texas Instruments of Dallas, Tex. The DSP was also configured to generate the three modulation signals with a varying amplitude, a frequency of 60 Hz, and separated in phase by 120 degrees. Further, for the configuration in FIG. 5, the DSP was configured to generate the two triangular carrier signals with a fixed amplitude, a frequency of 10 kHz, and separated in phase by 180 degrees.

As shown in FIG. 9, the conventional drive system provides a capacitor ripple current that is substantially higher than the capacitor ripple current for the system of FIG. 5, as shown by the difference between curves 902 and 904. In particular, FIG. 9 shows that the configuration in FIG. 5 provides a reduction in ripple current between 55% and 75%. That is, the ripple current in the configuration of FIG. 5 is less than ½ of that of a conventional drive system.

Other alternatives, modifications, equivalents, and variations will become apparent to those skilled in the art having reviewed the figures and read the foregoing description. Accordingly, the invention is intended to embrace those alternatives, modifications, equivalents, and variations as fall within the broad scope of the appended claims. The technology disclosed and claimed is available for license by the assignee of record.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that applicants do not seek to be bound by the theory presented.

While various embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. An electrical drive system comprising:
   a DC voltage supply;
   a capacitor connected in parallel with said DC voltage supply;
   an inverter circuit comprising a plurality of inverter switch pairs connected in parallel with said capacitor;
   one or more motor/generators coupled to the inverter circuit, the motor/generators defining two or more sets of stator windings, the plurality of inverter switch pairs are coupled to the sets of stator windings to form a plurality of inverter bridges coupled to each one of the sets of stator windings to provide an independent drive unit for each of the sets of stator windings; and
   a control circuit configured for generating control signals for the plurality of inverter bridges based on a plurality of modulation signals that have a phase shift with respect to each other and a plurality of carrier signals that have a phase shift with respect to each other,
   wherein each of the plurality of inverter switch pairs in each independent drive unit is associated with a different one of the plurality of modulation signals and each independent drive unit is associated with a different one of the plurality of carrier signals, and
   wherein the control circuit generates the control signals to close a positive switch of one inverter switch pair from the plurality of inverter switch pairs and open a negative switch of the one inverter switch pair if a signal value of a one of the plurality of modulation signals associated with the one inverter switch pair is greater than a signal value of the one of the plurality of carrier signals associated with the independent drive unit comprising the one inverter switch pair, else the control circuit generates the control signals to open the positive switch and close the negative switch.

2. The drive system as recited in claim 1, wherein at least one of the motor/generators comprises two sets of stator windings.

3. The drive system as recited in claim 2, wherein the two sets of stator windings are galvanically isolated.

4. The drive system as recited in claim 2, wherein the two sets of stator windings are electrically coupled.

5. The drive system as recited in claim 2, wherein at least a portion of the stator windings in the two sets of stator windings are co-located.

6. The drive system as recited in claim 2, wherein the plurality of stator windings in the two sets of windings are spatially separated.

7. The drive system as recited in claim 1, wherein each of the plurality of carrier signals comprises a triangular carrier signal.

8. The drive system as recited in claim 1, wherein each of the plurality of carrier signals are substantially identical.

9. A method for operating an electrical drive system comprising a plurality of drive units, each of the plurality of drive units comprising an inverter bridge comprising a plurality of inverter switch pairs, the method comprising the steps of:
   obtaining a plurality of triangular carrier signals and a plurality of modulation signals, each of the plurality of triangular carrier signals associated with a different one of the plurality of drive units and having an electrical degree phase shift in relation to each other of the plurality of triangular carrier signals, each of the plurality of modulation signals associated with a one of the plurality of inverter switch pairs in each of the plurality of drive units and having an electrical degree phase shift in relation to each other of the plurality of modulation signals; and
   generating control signals for each one of the plurality of drive units based on comparison of the plurality of modulation signals to a one of the plurality of triangular carrier signals associated with the one of the plurality of drive units, the generating comprising:
      obtaining a current carrier signal value for the one of the plurality of carrier signals associated with a one of the plurality of drive units;
      obtaining current modulation signal values for each of the plurality of modulation signals; and
      for each one of the current modulation signal values being greater than the current carrier signal value, configuring the control signals for a one of the plurality of inverter switch pairs from the one of the plurality of drive units associated with the one of the current modulation signal values for closing a positive switch of the one of the plurality of inverter switch pairs and opening a negative switch of the one of the plurality of inverter switch pairs, else configuring the control signals for opening the positive switch and closing the negative switch.

10. The method of claim 9, wherein the electrical degree phase shift between each of the plurality of triangular carrier signals is $2\pi/n$, where n is a number of the plurality of drive units.

11. The method of claim 9, wherein the step of configuring further comprises:
   producing the control signals for the negative switch by inverting the control signals for the positive switch.

12. A method for operating an electrical drive system comprising a plurality of drive units, each of the plurality of drive units comprising an inverter bridge comprising a plurality inverter switch pairs, the method comprising the steps of:
   obtaining a plurality of triangular carrier signals, each of the plurality of triangular carrier signals associated with a different one of the plurality of drive units and having an electrical degree phase shift in relation to each other of the plurality of triangular carrier signals;
   obtaining a plurality of modulation signals, each of the plurality of modulation signals associated with a one of the plurality of inverter switch pairs in each of the plurality of drive units and having an electrical degree phase shift in relation to each other of the plurality of modulation signals; and
   generating control signals for each one of the plurality of drive units based on comparison of the plurality of modulation signals to a one of the plurality of triangular carrier signals associated with the one of the plurality of drive units, wherein the generating comprises:

obtaining a current carrier signal value for the one of the plurality of carrier signals associated with a one of the plurality of drive units and current modulation signal values for each of the plurality of modulation signals;

comparing the current carrier signal value to the current modulation values; and for each one of the current modulation signal values being greater than the current carrier signal value, configuring the control signals for a one of the plurality of inverter switch pairs from the one of the plurality of drive units associated with the one of the current modulation signal values for closing a first switch of the one of the plurality of inverter switch pairs and opening a second switch of the one of the plurality of inverter switch pairs, else configuring the control signals for opening the first switch and closing the second switch.

13. An electrical drive system comprising:
a battery;
a capacitor connected in parallel with the battery;
an inverter circuit comprising a plurality of inverter switch pairs connected in parallel with said capacitor;
a motor/generator comprising a stator having two sets of stator windings, each of the sets of stator windings comprising two or more stator windings, and each of the stator windings associated with a phase group and being coupled to one of the plurality of inverter switch pairs, the plurality of inverter switch pairs coupled to each one of the sets of stator windings form an inverter bridge for the one of the sets of stator windings to form independent drive units for each of the sets of stator windings; and a control circuit configured for generating control signals for the plurality of inverter bridges based on a plurality of modulation signals that have a phase shift with respect to each other and a plurality of triangular carrier signals that have a phase shift with respect to each other, wherein each of the plurality of inverter switch pairs in each independent drive unit is associated with a different one of the plurality of modulation signals and each independent drive unit is associated with a different one of the plurality of triangular carrier signals, and wherein the control circuit generates the control signals to close a positive switch of one inverter switch pair from the plurality of inverter switch pairs and open a negative switch of the one inverter switch pair if a signal value of a one of the plurality of modulation signals associated with the phase group for the one inverter switch pair is greater than a signal value of the one of the plurality of carrier signals associated with the independent drive unit comprising the one inverter switch pair, else the control circuit generates the control signals to open the positive switch and close the negative switch.

14. The drive system as recited in claim 13, wherein the two sets of stator windings are galvanically isolated.

15. The drive system as recited in claim 13, wherein the two sets of stator windings are electrically coupled.

16. The drive system as recited in claim 13, wherein at least a portion of the plurality of the stator windings in the two sets of stator windings are co-located.

17. The drive system as recited in claim 13, wherein the plurality of stator windings in the two sets of windings are spatially separated.

* * * * *